United States Patent
Vieira

(10) Patent No.: US 6,912,355 B2
(45) Date of Patent: Jun. 28, 2005

(54) DEVICE FOR THE EVAPORATION OF VOLATILE ACTIVE SUBSTANCES HAVING A HEATING BODY AND METHOD

(75) Inventor: Pedro Queiroz Vieira, Parede (PT)

(73) Assignee: C.T.R., Consultoria Tecnica e Representacoes Lda., Parede (PT)

(*) Notice: Subject to any disclaimer, the term of this patent is extended or adjusted under 35 U.S.C. 154(b) by 0 days.

(21) Appl. No.: 10/753,295

(22) Filed: Jan. 8, 2004

(65) Prior Publication Data

US 2005/0040154 A1 Feb. 24, 2005

(30) Foreign Application Priority Data

Aug. 22, 2003 (EP) .............................. 03019048

(51) Int. Cl.$^7$ ................................. F24F 6/08
(52) U.S. Cl. ........................ 392/395; 392/386
(58) Field of Search ................. 392/386–395

(56) References Cited

U.S. PATENT DOCUMENTS 6,501,906 B2 * 12/2002 Vieira ...................... 392/395
6,594,445 B2 * 7/2003 Basaganas Millan ....... 392/395

* cited by examiner

Primary Examiner—Thor S. Campbell
(74) Attorney, Agent, or Firm—McNair Law Firm, PA; Cort Flint

(57) ABSTRACT

The invention relates to an evaporation device (4) for the evaporation of volatile active substances, in particular aromatic substances and/or insecticides, including a housing (3) and a heating device (2) within the housing having a heating body (1), capable of being heated to an evaporation temperature for the evaporation of the active substance. According to the invention, the heating body (1) is in formed from a heat-conducting synthetic material encapsulating a heating element (5). Heat from the heating element is transferred through the heat conducting heating body to evaporate the active substance. A heating device (2) of this type can be produced easily and economically with little manufacturing expenditure. The invention furthermore relates to a heating device to be used in a device for the evaporation of volatile active substances as well as to a method for the production of the heating device.

26 Claims, 4 Drawing Sheets

DEVICE FOR THE EVAPORATION OF VOLATILE ACTIVE SUBSTANCES HAVING A HEATING BODY AND METHOD

BACKGROUND OF THE INVENTION

This invention relates to a device for the evaporation of volatile substances, in particular aromatic substances, insecticides, and the like. In particular, this invention relates to a heating device to be used in the evaporation device, as well as to a process for the production of such a heating device.

Devices for the evaporation of volatile active substances, in particular of aromatic substances and/or insecticides, are generally known. For instance, evaporation devices are known where a small plate impregnated with an active substance, inserted into an evaporation device, is heated by a heating device to evaporate the active substance. A method is also known by which containers containing volatile liquid substances are inserted in a housing of an evaporation device. This container is provided with a wick that conveys the substance to be evaporated out of the container by means of capillary effect. The wick end protruding from the container is next to a heating device with a ceramic heating body so that the volatile substance is evaporated by the heat radiated from the ceramic heating body and can escape into the environment through aeration slits in the housing. European publication EP 1195 169 A1 relates to a device of this type and discloses a device for the evaporation of volatile active substances with a housing containing a heating device with at least one heating body that can be heated to an evaporating temperature to evaporate an active ingredient placed in the housing. In practice, the heating body is designed as a ceramic heating body containing an electric resistance element to heat the heating body. The heating element is connected via electric lines to a connector plug installed on the housing. The resistance element is coated at least on part of its surface with a resistance coating that is notched by cutting or grinding at least within a certain area to select a given resistance value corresponding to an evaporating temperature called for by the substance to be evaporated. During the manufacture of the heating device this resistance element is inserted manually into an opening made in the ceramic heating body and is then encapsulated with a material presenting great heat conductivity in order to fix the resistance element securely in the ceramic heating body. This encapsulating with a preferably flame resistant insulation cement is essentially effected manually in order to ensure the precise positioning of the resistance element. At the opposite ends of the opening in the ceramic heating body, and at either side of the resistance element, a slit is made through which the electric lines emerge from the ceramic heating body, e.g. to a switch or to a connector plug.

From EP 0 451 331 A1 an evaporation device is known for the evaporation of volatile active substances in which the heating device consists of a ceramic heating body with an electric, imbedded heating coil. This ceramic heating body is provided with a receptacle extending in a straight line at a tangent to its passage channel, so that a heating coil can be inserted and it can be filled with a sealing mass.

Furthermore a ceramic body of this type, combined with an evaporation device for liquid insecticides or perfumes, is also known from EP 0 943 344 A1, EP 0962 132 A1 and EP 1 108 358 A1.

An object of the present invention is to create an improved device for the evaporation of volatile active substances, in particular aromatic substances and/or insecticides, that is simple and economical in construction and by means of which a required evaporating temperature can be achieved in a reliable manner.

Another object of the invention is to provide a method for producing such a heating device in the simplest way possible and mostly automatically.

SUMMARY OF THE INVENTION

The above objectives are accomplished according to the present invention by a synthetic heating body which allows for a particularly simple and economical construction, and the synthetic material is easily processed. The synthetic heating body can be produced in a simple and mostly automated manner, such as an injection molding process. An electric resistance element integrated into the synthetic heating body is simply inserted as an electric heating element into a suitable tool form and is positioned therein. The polymer is introduced into the mold to encapsulate the electric heating element and provides a synthetic, conductive heating body. By making the heating body of a synthetic material, it is possible to save the cost of ceramic material that is considerably more expensive than any synthetic material. According to the invention no receptacle has to be made in the heating body, as is the case in the state of the art cited earlier, for the electric heating element, e.g. a resistance element. Thus, an entirely new course is set in the field of evaporation devices for insecticides and/or aromatics with the design of the heating body as a synthetic heating body according to the invention. The cost of production, material and components are considerably reduced so that very economical evaporation devices can be brought to the market. This is especially good in view of the fact that evaporation devices are often disposable items used only one time. Furthermore, a design of synthetic heating body allows for the construction of very small evaporation devices, so that the housings containing the heating body can also be made very small. As a result, economical small dimensions can be realized, i.e. miniaturized evaporation devices can be created.

The synthetic heating body is advantageously made essentially of a thermoplastic. This is preferably a partially crystalline thermoplastic, such as a polyamide. Especially good heating results can be achieved with a type PA 6.6 polyamide. An inventors' tests have shown, very good evaporation results can be achieved with these synthetic heating bodies. Synthetic materials of this type have so far been used in the art only in combination with machine elements, e.g. gears, casters, conveyor chains, bearings, etc. In electrical engineering, mainly insulation and impact resistant housings are made of polyamide. With the present design of a synthetic heating body, e.g. made of polyamide PA 6.6, a completely new course is set in the field of evaporation devices for insecticides and/or aromatics, making it possible to produce reliably heating bodies inexpensively. Advantageously, the synthetic heating body is reinforced with fibers, preferably glass fibers. The mechanical characteristics of the synthetic heating body can be improved in this manner. Components with which a heat distribution is possible can also be integrated into the synthetic heating body.

In a preferred embodiment, the synthetic heating body can be heated to evaporation temperature by means of at least one electric heating element. Preferably the electric heating element is imbedded in the block-shaped synthetic heating body by encapsulation.

Basically any electric heating element can be used, e.g. a heating coil or a PTC resistance element. Advantageously, an electric resistance element is provided by a rod-shaped resistance body coated at least partially with a resistance coating with a spiraling notch 16 made such by laser cutting or grinding in some areas to select a given resistance value. This resistance value corresponds to an evaporation temperature adapted to the composition of the active substance to be evaporated. Such a resistance element also contributes to a relatively miniaturized construction. Another advantage of a construction of the resistance element is that the evaporation temperature can be adjusted optimally for the composition of the substance to be evaporated by notch cutting or grinding. The danger of flammability of the overall device or of certain components can be reduced, and possible negative effects on the degree of evaporation can be avoided.

There are several possibilities for cutting or grinding notches into the resistance layer in order to select a given resistance value. In a preferred embodiment, the resistance layer is notched by cutting around the rod-shaped, preferably cylindrical, resistance body, in a spiraling manner, preferably through laser spiral cutting. With such a spiraling cut the resistance value can be easily adjusted precisely for optimal evaporation performance.

The resistance layer can be made of different materials, e.g. in the form of a layer of precious metal. In a preferred embodiment, the resistance layer consists of a metal oxide layer, preferably a coating of nickel-chrome alloy. Such a metal oxide coating is advantageously burned on thermochemically, e.g. steamed on or sputtered on under vacuum in form of a thin layer. Following the application of the resistance layer, the latter is advantageously subjected to a thermal process in order to stabilize the resistance layer.

In addition or alternatively, the resistance body can be made of a ceramic material, preferably with a high content of $Al_3O_3$ (aluminum oxide), whereby especially good heat conductivity of the resistance body, and thereby of the overall resistance element, can be achieved. The $Al_3O_3$ content depends on the actual conditions of integration, e.g. the material used for the housing, etc.

Metal caps are preferably pressed on each end of the coated rod-shaped resistance body. At each of these caps an electric line is connected, preferably by soldering, each line being connected to the connector plug. Preferably copper wires for good electrical conductivity are used as the electric lines. By means of such metal caps, a good electrical contact with the resistance layer is further established in a simple and reliable manner.

Advantageously, the synthetic heating body is at least partially block-shaped, preferably in form of a parailelepipedon with electrical lines preferably protruding from areas of the heating body across from each other. In principle however, the synthetic material heating body can be given any desired shape. The heating body is so compact that the length of the resistance element as seen in the longitudinal direction of the opening, is approximately equal to the width of the synthetic heating body. The electrical lines in the area of the caps that extend approximately at a right angle to the resistance element extend nearly parallel to each other and lie on one line with the two plug-in connections of a connector plug. With such an orientation of the electrical lines a compact construction of the heating device is furthermore achieved. This also contributes to the minimization of the housing size and thereby of the overall evaporation device in the desired manner.

The synthetic heating body according to the invention can be inserted into an evaporation device in which an active substance is evaporated via an active substance plate impregnated with an active substance. Especially preferred however is the utilization in an evaporation device where the housing can be combined with a container for a substance to be evaporated. A wick is inserted into this container. If a container is combined with the housing for the evaporation of the substance contained in the container, the wick's end protrudes from the container and is associated with the synthetic heating body. For this, a wick opening is provided in the synthetic heating body into which the wick end extends. This wick opening can be, for example, in form of a passage hole, but can also be in form of a recess at the edge, e.g. vertical and continuous.

For targeted heat transfer toward given areas of the synthetic heating body, the heating body can be provided on at least part of an outside surface with a heat conducting metal element. In an especially preferred manner the wick opening is coated on the inside with such a metal element. Very good results, with very good heat concentration around a wick of a container extending into a passage hole of the synthetic heating body, are achieved if a metal ring is inserted into this passage hole. A metal element of this type, e.g. a metal ring, can be inserted or attached after the production of the synthetic heating body. This metal element, or the metal ring, can however also just as well be encapsulated together with the synthetic heating body during its fabrication.

In a first process step according to the invention, the electric heating element is placed and positioned in a casting mold of a plastic casting machine, preferably an injection molding machine. In a subsequent process step the casting mold is closed and a synthetic material is poured into the casting mold to encapsulate the electric heating element with a synthetic heating body at least partially. In a preferred process, the electric heating element is encapsulated so that electrical connection conduits protrude from the synthetic heating body after completion of the heating device. In this way the synthetic heating body can be rapidly and reliably connected to the right connections locations.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
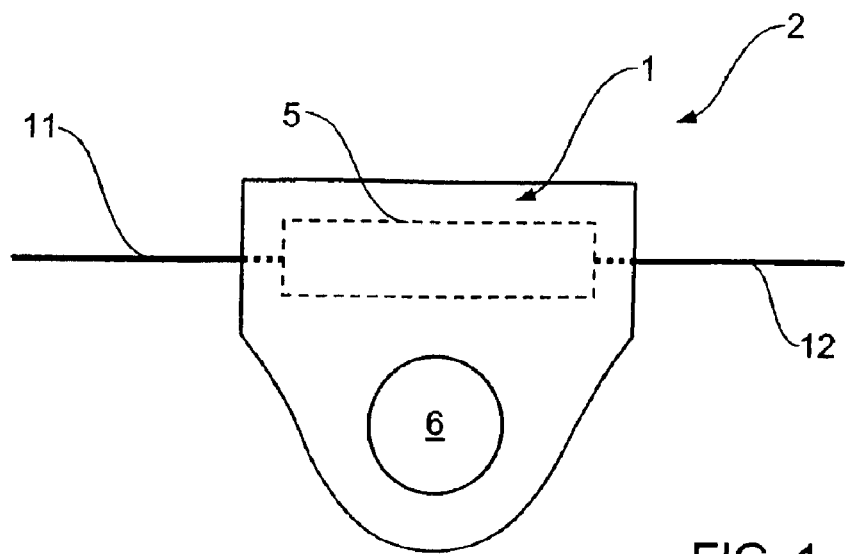
FIG. 1 is a schematic top view illustrating a synthetic heating body according to the invention in which an electric resistance element is encapsulated.
Figure 4:
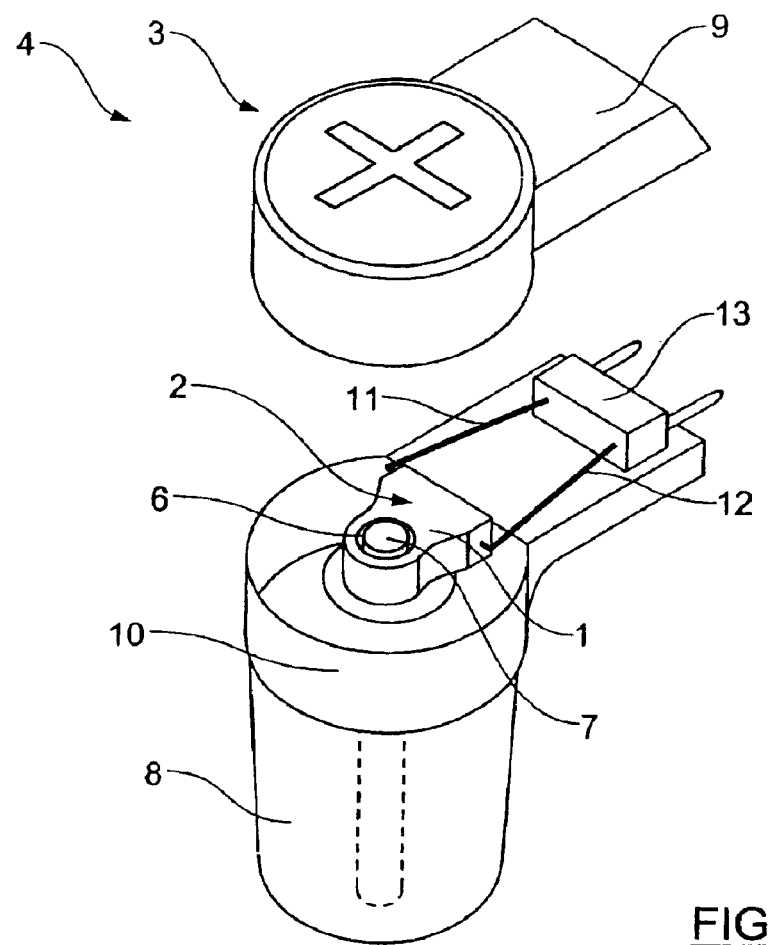
FIG. 4 is a schematic perspective view of an evaporation device for the evaporation of volatile active substances having a synthetic heating body according to the invention.

FIG. 1 is a schematic top view of a heating body 1 made from a suitable synthetic material designed in the shape of a block that can be inserted as a component of a heating device 2 into a housing 3 of an evaporation device 4, as FIG. 4 schematically shows.

Figure 2:
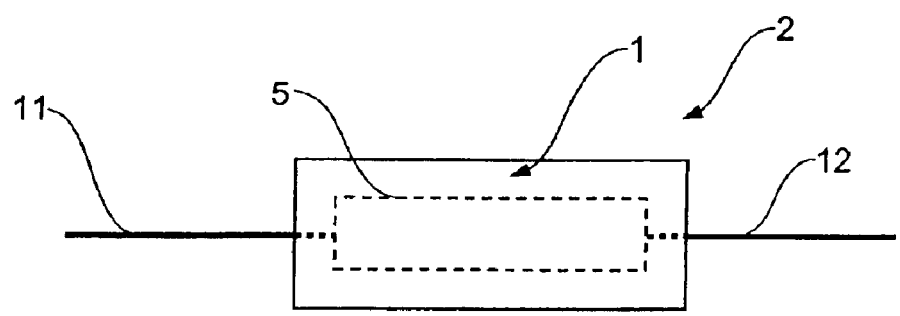
FIG. 2 shows a schematic rear view of the synthetic heating body of FIG. 1.

As can be seen in the rear view of FIG. 2, synthetic heating body 1 has a flat configuration. The synthetic heating body 1 is provided with passage hole 6 for a wick 7 in proximity to an electrical resistance element 5 encapsulated in heating body 1, as shown in FIG. 1 in combination with FIG. 4. Wick 7 is a component of a container 8 in which a liquid to be evaporated is contained. Wick 7 is inserted into container 8 in such a manner that Wick 7 extends with a wick end into passage hole 6 provided in housing 3 of evaporation device 4. As illustrated, housing 3 is made in two parts, an upper housing shell 9 and a lower housing shell 10 which clampingly hold heating device 2. Housing shell 10 may also be made to hold heating body 1 on the one hand, and on the other hand a connector plug 13 connected to electric connection lines 1, 12 of resistance element 5.

Figure 3:
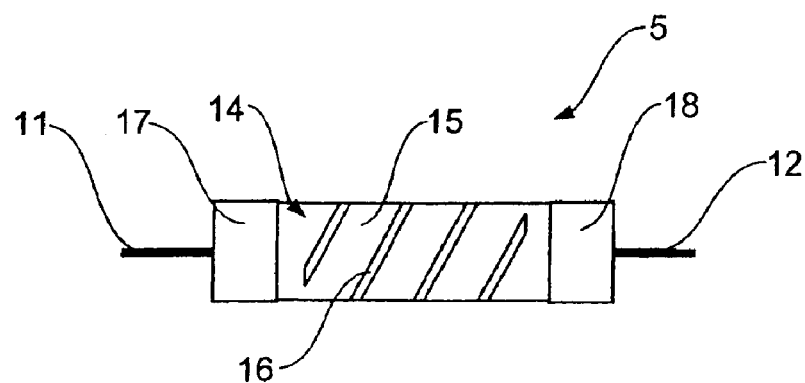
FIG. 3 is an enlarged representation of the electric resistance element encapsulated in the synthetic heating body of FIGS. 1 and 2.

As can be seen in FIG. 3, resistance element 5 is encapsulated in heating body 1 and is provided by a rod-shaped resistance body 14 that is coated with a resistance layer 15. This resistance layer is notched for example, by a spiraling cut 16 made by laser spiral cutting for the selection of a given resistance value to achieve an evaporation temperature for the liquid in the container 8. The resistance layer 15 can be a metal oxide layer for example, while the resistance body itself is made of ceramic with a high content of $Al_2O_3$. On each of the ends of the coated rod-shaped resistance body 14, metal caps 17, 18 are placed to which the electric lines 11, 12 are soldered.

The resistance element 5, designed in this manner, is placed into a casting mold (not shown), or into a suitable tool of an injection-molding machine, and is positioned there in a first process step for the manufacture of the heating device 2. In a subsequent process step, a heat-conducting synthetic material, e.g. a glass-fiber reinforced polyamide, is poured into the closed casting mold or tool in order to encapsulate the electrical resistance element 5 with a synthetic heating body. A particularly advantageous polyamide material is a heat stabilized PA 6.6 available from LATI USA, Inc. of Summerville, S.C. Resistance element 5 is poured in such manner that after the completion of the heating device 2, electric lines 11, 12 protrude from heating body 1, as shown schematically in FIGS. 1 and 2. An injection molding process is especially well suited as the production process, whereby resistance element 5 is placed into the casting mold and positioned therein by means of a robot device in order to automate this manufacturing process, as described in more detail below. Following the casting process, the completed cast heating body 1 is taken from the opened casting mold for further utilization by means of the same or another robot device.

Figure 7:
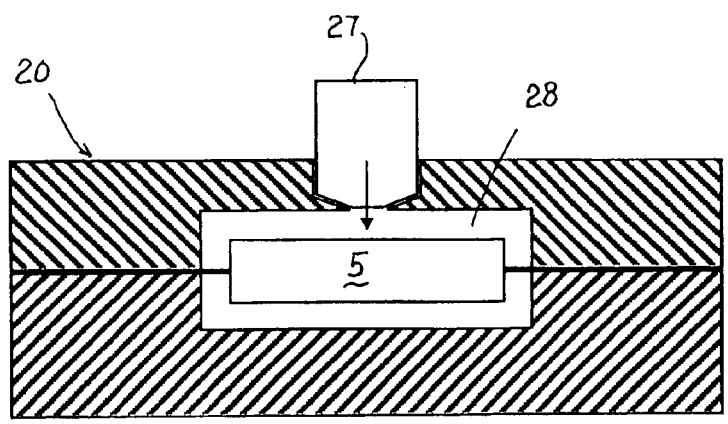
FIG. 7 is a schematic illustration illustrating a resistor element within a mold cavity of the mold of FIG. 6 after the mold has been closed.
Figure 8:
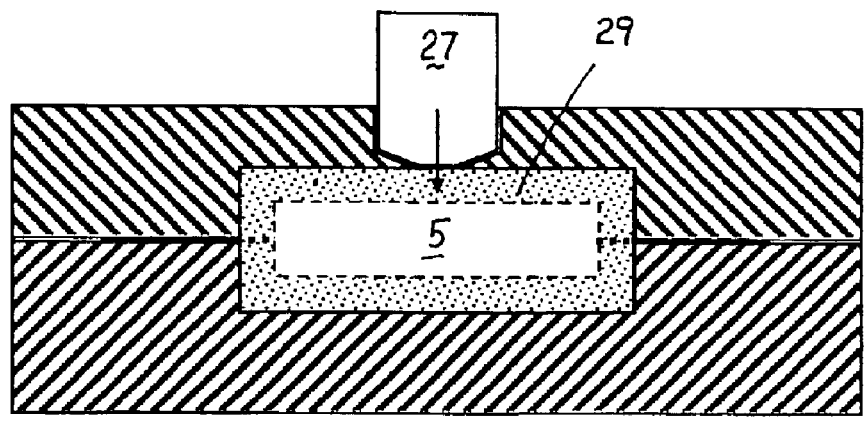
FIG. 8 is a schematic illustration of a cross section of a mold in which a heating element is retained with plastic material injected around the heating element.
Figure 9:
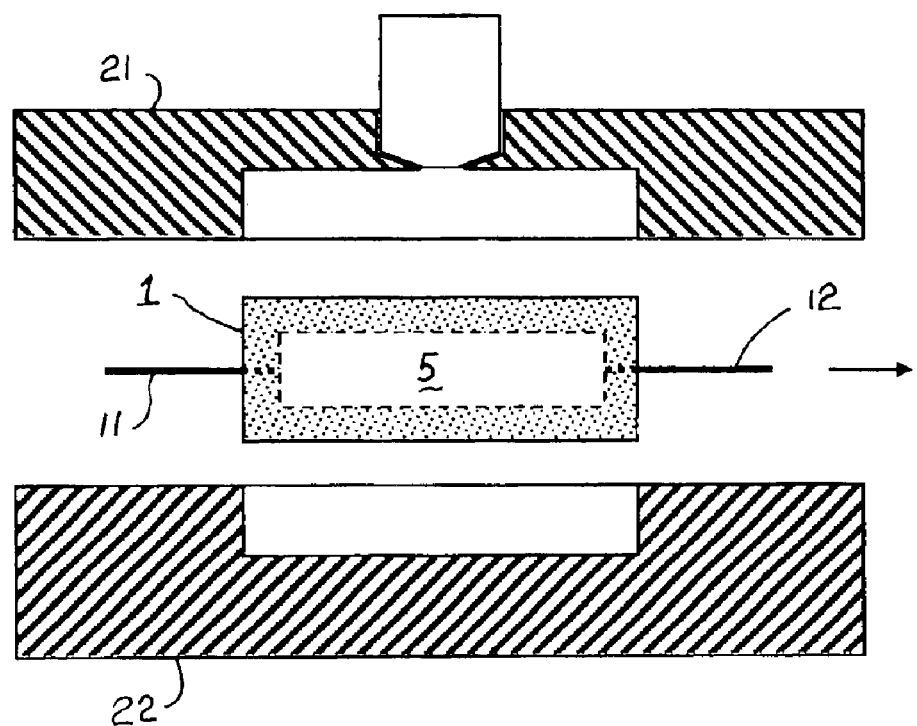
FIG. 9 is a schematic illustration of a cross section of a mold where the mold has been opened and the heating element has been removed from the mold cavity.

Referring now to FIGS. 6 through 9, the casing process will be described in more detail. As can best be seen in FIG. 6, an injection mold is illustrated at 20 having a first mold part 21, and a second mold part 22, with mold cavity parts 23 and 24. With the molding parts separated, resistor element 5 is placed in the area of the cavity parts by means of a robotic element 25 which moves in 2 degrees of freedom. With the resistor element in place, the mold is closed whereupon a mold cavity 26 is defined. With the mold closed, a polymeric material is injected by a injection device 27 into mold 26 (FIG. 7). The polymeric material 28 encapsulates and encases resistor element 5 (FIG. 8). Finally, the injection mold is opened whereupon the encapsulated heating element 29 can be removed by the robot device. In this manner, an electric resistor element can be encapsulated in a synthetic heating body for advantageous use in an evaporation device.

Figure 5:
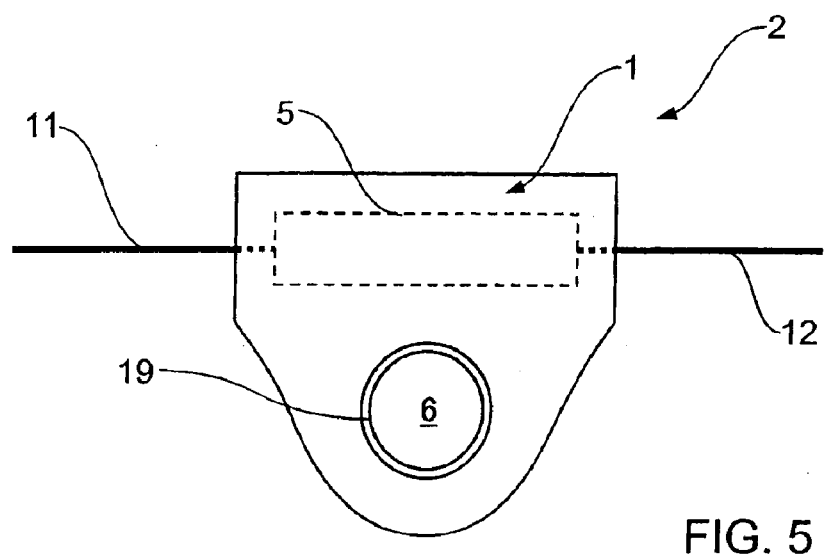
FIG. 5 is a schematic top view of the synthetic heating body according to the invention as shown in FIG. 1, with a metal ring inserted into the passage hole.
Figure 6:
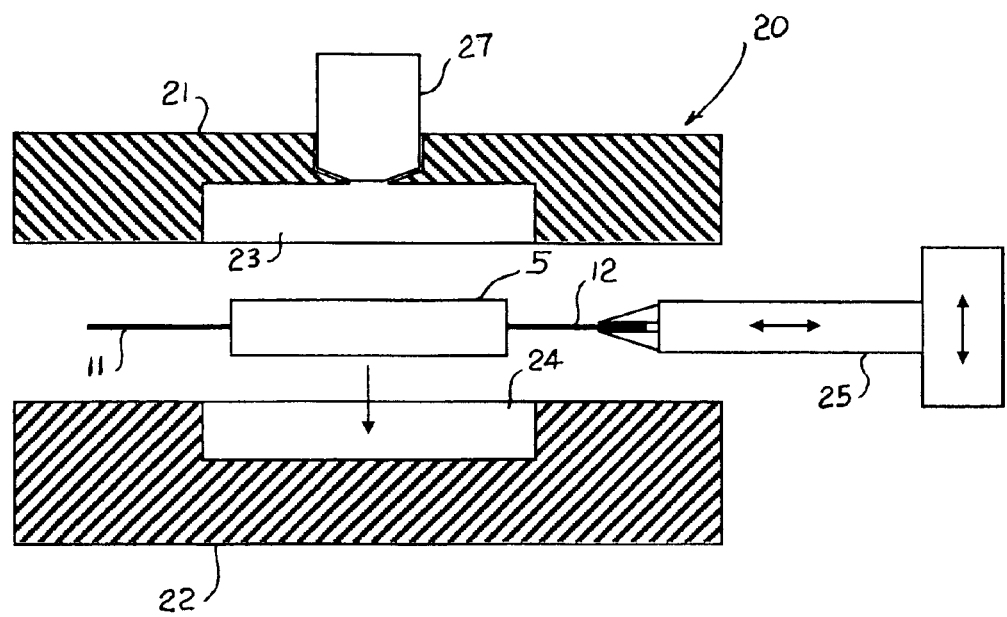
FIG. 6 is a schematic illustration showing a resistor element being placed within the opening of a mold.

Finally FIG. 5 shows an alternative embodiment in which a metal ring 19 is pressed into the passage hole 6 of the synthetic heating body 1 upon completion of the production of the synthetic-material heating body 1. As a result a preferred concentration of the heat conduction toward the wick is achieved. This considerably increases the evaporating performance of heating body 1 and heating device 2.

While a preferred embodiment of the invention has been described using specific terms, such description is for illustrative purposes only, and it is to be understood that changes and variations may be made without departing from the spirit or scope of the following claims.

What is claimed is:

1. An evaporation device for volatile active substances including aromatics and insecticides having a housing (3) with a heating device (2) associated with the housing wherein said heating device comprises a plastic heating body (1) formed from a plastic material capable of being heated to an evaporation temperature of a volatile active substance, and said heating body includes an electrical heating element (5) molded within said plastic material of said heating body as one piece for heating said heating body to evaporate said volatile substance.

2. The device of claim 1 wherein said synthetic heating body is made essentially of a partially crystalline thermoplastic material.

3. The device of claim 2 wherein said thermoplastic material includes polyamide.

4. The device of claim 3 wherein said heating body is composed of a type PA 6.6 polyamide.

5. The device of claim 2 wherein said synthetic heating body is reinforced by fibers.

6. The device of claim 1 wherein said electric heating element includes an electric resistance heating element (5) having a rod-shaped resistance body (14) coated at least in part with a resistance layer (15) wherein certain areas of said resistance layer are removed to provide a desired resistance value corresponding to an evaporation temperature of the active substance to be evaporated.

7. The device of claim 6 wherein said removed resistance layer areas include a spiral cut (16) formed about said rod-shaped resistance body (14) with a spiraling cut (16).

8. The device of claim 7 wherein said resistance layer (15) includes a metal oxide layer, and said resistance body (14) is made of a ceramic material and includes a metal cap (17, 18) placed on each end of said rod-shaped resistance body (14), with electric lines (11, 12) attached to said caps for connecting to a connector plug (13).

9. The device of claim 8 wherein said metal oxide layer includes a chrome alloy, and said ceramic material includes a high $Al_2O_3$ content.

10. The device of claim 1 wherein said heating element includes electrical lines (11, 12) protruding from prescribed surfaces of said heating body.

11. The device of claim 10 wherein housing (3) is adapted for fitting with a container (8) of a substance to be evaporated, and including a wick (7) extending from the container (8) having a wick end protruding through said synthetic heating body (1), and a wick passage formed through the heating body through which the wick end extends for the heating and evaporation of the substance in the container.

12. The device of claim 11 wherein said heating body is provided with a heat-conducting metal element (19) at an external surface area of said body.

13. The device of claim 12 wherein said wick passage is lined at least in part with said metal element (19).

14. The device of claim 13 wherein said metal element includes a metal ring inserted into said passage.

15. An evaporation device for evaporating volatile substances having an electrical heating element for heating the substance to be vaporized, said device comprising:
   a housing;
   a plastic heating body formed from molding the heating element in place within a heat conducting plastic material wherein electrical wires of said electrical element extend from said heating body;
   said heating element molded within said heating body in heat-transfer relationship with said heating body causing said heating body to conduct heat for evaporating said volatile substance;
   a wick passage formed in said heating body receiving heat from said heating body;
   a container carried by one of said housing and heating body for containing the volatile substance to be evaporated;
   a wick carried in said container having a wick end extending through said wick passage so that the volatile substance is evaporated from said wick by heat transfer through the heat conducting plastic material of said heating body.

16. The device of claim 15 wherein said heating body is made from a thermoplastic material.

17. The device of claim 16 wherein said thermoplastic material includes a polyamide material.

18. The device of claim 17 wherein said polyamide is a type PA 6.6 polyamide.

19. The device of claim 16 wherein said thermoplastic material is reinforced with fibers.

20. The heating device of claim 15 wherein said electric heating element includes an electric resistance element having a rod-shaped body coated with a resistance layer, and including a spiral cut formed in the resistance layer to provide a given resistance value corresponding to an evaporation temperature effective for evaporating the volatile substance.

21. The heating device of claim 20 wherein said synthetic heating body includes electrical conductors encapsulated in and protruding from the heating body for connection to a power source.

22. The heating device of claim 15 including a conductive metal ring surrounding said wick passage for transferring heat from said heat conductive material of said heating body to said wick.

23. In a method for producing a heated evaporation device for evaporation of volatile active substances such as aromatics, insecticides, and the like having an electric heating element for heating the evaporative substance, a method for producing a synthetic heating body which includes an electric heating element comprising:
   positioning the heating element in a mold; introducing a heat conductive synthetic material into the mold for at least partially encapsulating the heating element to provide an encapsulated synthetic heating body having electrical connectors extending from opposing ends; and removing the encapsulated heating body from the mold.

24. The method of claim 21 including encapsulating the heating element so that electrical connectors connected to said heating element extend from the synthetic heating body.

25. The method of claim 24 including inserting and positioning the heating element in the mold by means of a robot device and removing the heating element by a robot device.

26. The method of claim 23 including incorporating the encapsulated heating body into the evaporation device for heating the substance being evaporated.

\* \* \* \* \*